(Model.)

W. E. SPARKS.
MASTER KEY LOCK.

No. 390,527. Patented Oct. 2, 1888.

Witnesses
J. H. Shumway
Fred C. Earl

Wm. E. Sparks
Inventor
By atty (Model.)

W. E. SPARKS.
MASTER KEY LOCK.

No. 390,527.

Patented Oct. 2, 1888.

Witnesses:
J. N. Shumway
Fred C. Earle

Wm. E. Sparks,
Inventor
By Atty.

(Model.)

W. E. SPARKS.
MASTER KEY LOCK.

Patented Oct. 2, 1888.

Witnesses
J. N. Shumway
Fred C. Earle

Wm. E. Sparks
Inventor
By Atty.

(Model.)

W. E. SPARKS.
MASTER KEY LOCK.

Patented Oct. 2, 1888.

Witnesses
J. H. Shumway
Fred C. Earle

Wm. E. Sparks
Inventor
By Atty.

(Model.)

W. E. SPARKS.
MASTER KEY LOCK.

No. 390,527. Patented Oct. 2, 1888.

(Model.) 7 Sheets—Sheet 6.

W. E. SPARKS.
MASTER KEY LOCK.

No. 390,527. Patented Oct. 2, 1888.

(Model.)

W. E. SPARKS.
MASTER KEY LOCK.

No. 390,527.

Patented Oct. 2, 1888.

UNITED STATES PATENT OFFICE.

WILLIAM E. SPARKS, OF NEW HAVEN, CONNECTICUT, ASSIGNOR TO THE SARGENT & COMPANY, OF SAME PLACE.

MASTER-KEY LOCK.

SPECIFICATION forming part of Letters Patent No. 390,527, dated October 2, 1888.

Application filed March 19, 1888. Serial No. 267,711. (Model.)

*To all whom it may concern:*

Be it known that I, WILLIAM E. SPARKS, of New Haven, in the county of New Haven and State of Connecticut, have invented a new Improvement in Master-Key Locks; and I do hereby declare the following, when taken in connection with accompanying drawings and the letters of reference marked thereon, to be a full, clear, and exact description of the same, and which said drawings constitute part of this specification, and represent in all the figures an interior view of the lock-case, showing the bolt and its mechanism.

This invention relates to an improvement in that class of door-locks which are adapted for hotels and other places where numerous doors are fitted with locks of like character, but which locks are so different from each other that the same key will unlock but one of the series of locks, these keys being called the "principal" keys; but yet the said locks are adapted to all be opened by a single key, which is called the "master-key."

The object is to construct the lock with but a single key-hole opening from opposite sides of the lock, a single set of tumblers, and so that either key may be introduced through either side of the lock and operate the same tumblers, and either key throw or draw the bolt, as the case may be, irrespective of which key had previously thrown or drawn the bolt; and the invention consists in the construction hereinafter described, and more particularly recited in the claims.

In illustrating the invention I only represent the lock mechanism. It will be understood, however, that the latch mechanism is usually employed in this class of locks; but such mechanism is too well known to require illustration.

A represents the case, B its face-plate, and C the locking-bolt. The lock-bolt is guided in its movement by a post, D, stationary in the case, which works through a slot, E, in the bolt, as indicated in Fig. 2, and as in the usual construction of this class of locks.

F represents the stump, which is formed as a part of a lever, G, which extends from the stump forward, and is hung upon a pivot, H, stationary in the case, and provided with a spring, I, which takes a bearing in the case, the tendency of the spring being to yieldingly hold the lever G downward.

Figure 2:
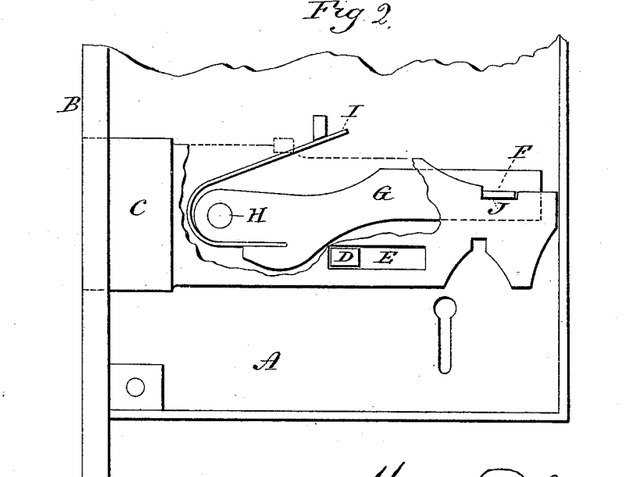
Fig. 2, the bolt as drawn, the tumblers removed, and the bolt broken away to show the stump-lever.

The bolt is preferably constructed with a notch, J, into which the stump falls when the bolt is in the drawn position, as seen in Fig. 2, and so that the stump forms a stop to prevent the accidental outward movement of the bolt; hence with such a notch the stump F must be raised from the notch before the bolt can be thrown.

The several tumblers are hung upon a pivot, K, upon or formed as a part of the bolt, and so that the tumblers may swing up and down thereon.

Figure 1:
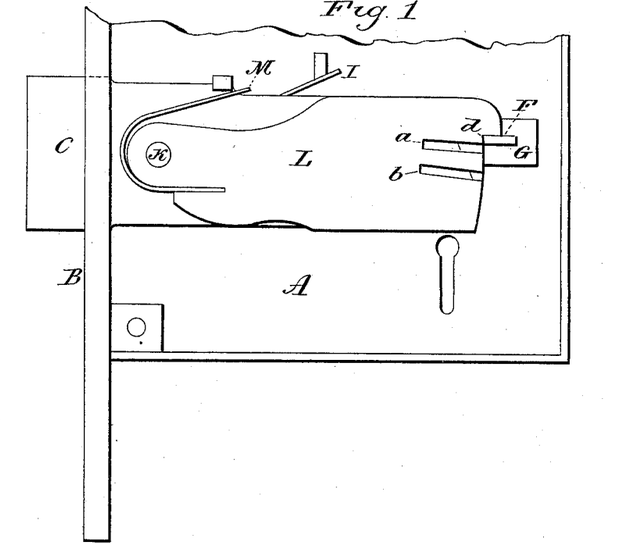
Figure 1 represents the bolt as thrown, showing the tumblers as in their locked position.

In Fig. 1 the first or outer tumbler, L, only appears. The tumblers are all provided with springs M, which take a bearing in the case, the tendency of which spring is to yieldingly hold the tumblers in their down or normal position.

The tumblers, with the exceptions hereinafter mentioned, are each constructed with two gates, $a\ b$, which open at the rear end of the tumblers. These gates in width correspond to the thickness of the stump F, and so that when the tumblers are turned upon their pivot to bring the opening of the respective gates into line with the stump the gates themselves are substantially parallel with the stump.

In Fig. 1 the bolt is represented as thrown. The several tumblers are constructed with a shoulder, $d$, which, when the bolt is thrown, will drop forward of the stump, and thereby prevent the bolt from being drawn until the tumblers shall be raised to bring the respective gates into line therewith.

Figure 7:
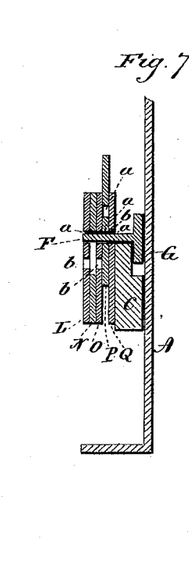
Fig. 7, a transverse section through the stump, showing the tumblers in the position as unlocked with the master-key.
Figure 8:
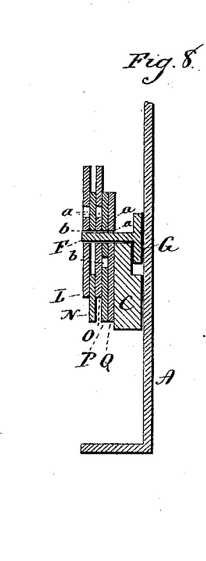
Fig. 8, the same section as when unlocked by the principal key.
Figure 9:
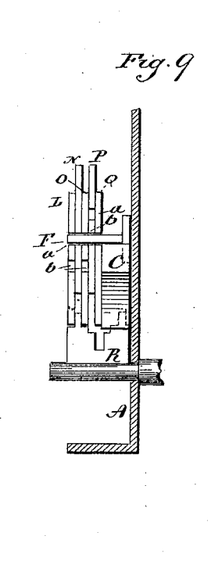
Fig. 9, a transverse section through the case, showing the rear end view of the tumblers as when unlocked by the master-key and raised by the principal key as in locking with that principal key.
Figure 10:
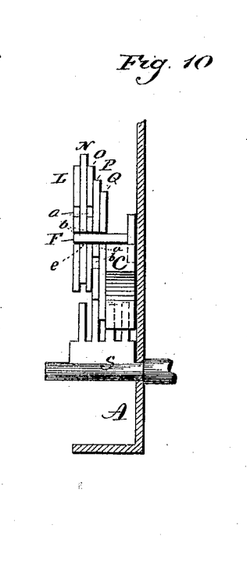
Fig. 10, the same rear end view of the tumblers, showing them in the position as when unlocked by the principal key and as raised by the master-key preparatory to throwing the bolt.

I represent the lock as constructed with five tumblers, L, N, O, P, and Q, as seen in Figs. 7, 8, 9, and 10, these tumblers all being hung upon the same pivot, K, and, with the exception of the tumblers N and Q, are each constructed with two gates, $a\ b$. The tumbler Q in this illustration is only constructed with a single gate, $a$. The principal key R is represented in Fig. 9, and the master-key S is represented in Fig. 10, each as being in the lock and operating upon the tumblers. When the bolt is thrown, as in Fig. 1, all the tumblers drop into the same line, and so as to bring their respective shoulders forward of the stump to resist the withdrawal of the bolt, so that at that time all the gates are below the stump.

Figure 3:
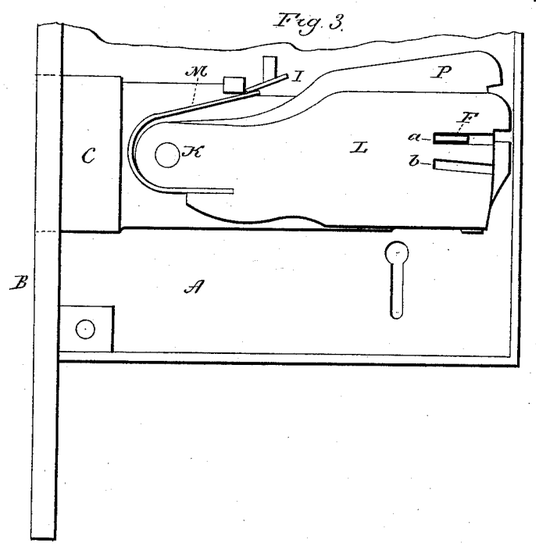
Fig. 3, the tumblers in the position when the bolt is drawn by the master-key.
Figure 4:
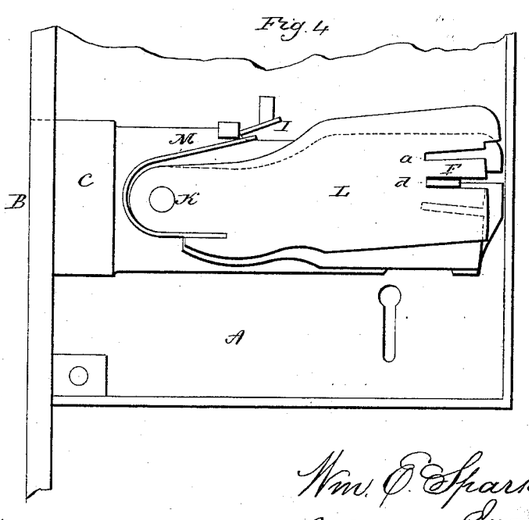
Fig. 4, the position of the bolt and tumblers when drawn with the principal key.
Figure 5:
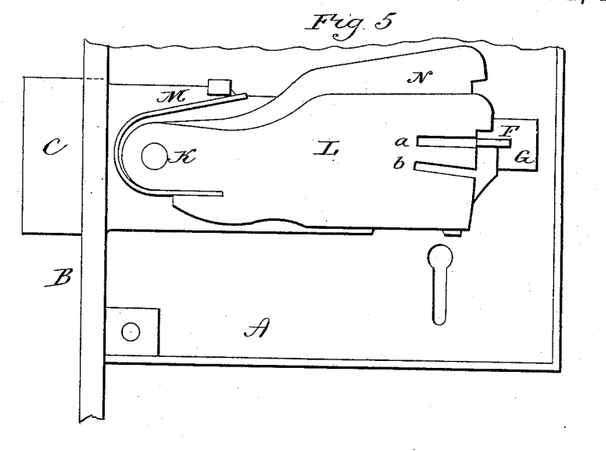
Fig. 5, the bolt and tumblers as when the tumblers are raised by the master-key preparatory to unlocking.

The shape of the bit of the master-key is such that its shoulders will strike the respective tumblers and raise them to a point where one of the gates of each tumbler will register with the stump, as seen in Fig. 7, this position being also represented in Fig. 5. Then the key, engaging the talons of the bolt, will withdraw it, the tumblers passing onto the stump, as represented in Fig. 7; but the shoulders on the bit do not bring the corresponding gate of each tumbler to the same line, as will be seen in Fig. 7, in which the tumbler P is represented as raised, so that its gate $b$ passes onto the stump, which will leave the said tumbler P in the unlocked position above the other tumblers, as also seen in Fig. 3.

Figure 6:
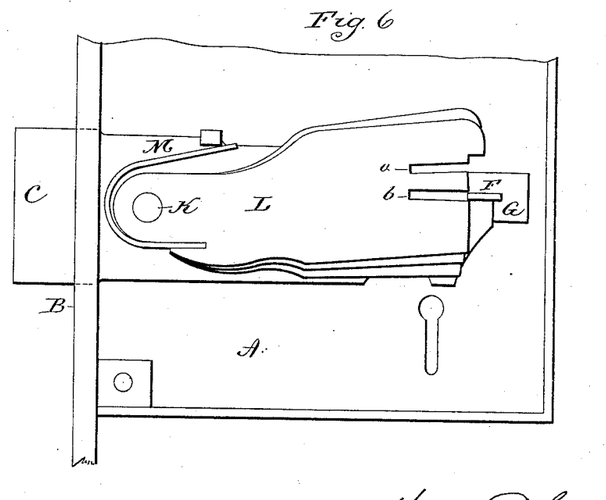
Fig. 6, the bolt and tumblers as when raised by the principal key preparatory to unlocking.

Now, if the principal key be applied to throw the bolt while the tumblers were yet in the position, Fig. 7, where they were left by the master-key, the tumblers L, O, and Q are each engaged with the stump, but all in the same line, yet the shoulders of the master-key are in different lines. The result of this is that as the principal key is inserted and turned, as seen in Fig. 9, the highest projection of the key will strike its tumblers—say either L, O, or Q, while P, being so far above, cannot be reached; but inasmuch as the tumblers are all engaged with the stump the engagement of the key with any one of the tumblers will raise that tumbler and the stump with it, so as to take the stump out of its notch in the bolt, and the stump being engaged with all the tumblers the tumblers will be raised accordingly by the key through the stump, irrespective of the shape of the key, as seen in Fig. 9; but so soon as the bolt is thrown all the tumblers drop into the same line and engaging position, as seen in Fig. 1. If, now, the principal key be employed in unlocking or drawing the bolt, the tumblers will be raised to bring their gates respectively into line with the stump and according to the shoulders of the bit, and, as represented in Fig. 8, (also seen in Fig. 6,) different gates now passing onto the stump from those which did so under the action of the master-key. Then if the key be withdrawn and the master-key be employed to throw the bolt its action upon the tumblers will be as seen in Fig. 10, and because it engages one or more of the tumblers and all the tumblers are engaged with the stump it necessarily follows that all the tumblers will rise under the action of those engaged by the bit of the master-key, and the key will engage the talons of the bolt and throw the bolt, when the tumblers will all return into their down or normal position.

The inner tumbler, Q, stands in a central position in the lock, and so that the same shoulder of either key will engage that tumbler, when introduced from either side, to draw the bolt. The shoulders of the bit on both sides of this central shoulder are alike, so that whether introduced from one side of the lock or the other the same key will operate upon the same tumblers in the same manner.

Figure 11:
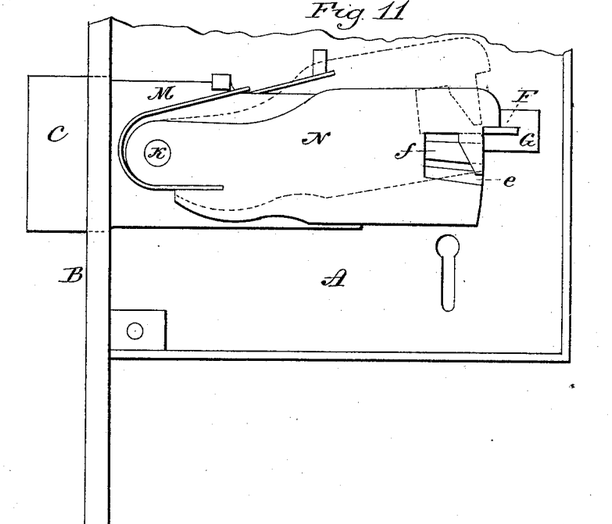
Fig. 11, the bolt as thrown, one of the tumblers being removed to show the tumbler N as in the locked position.
Figure 12:
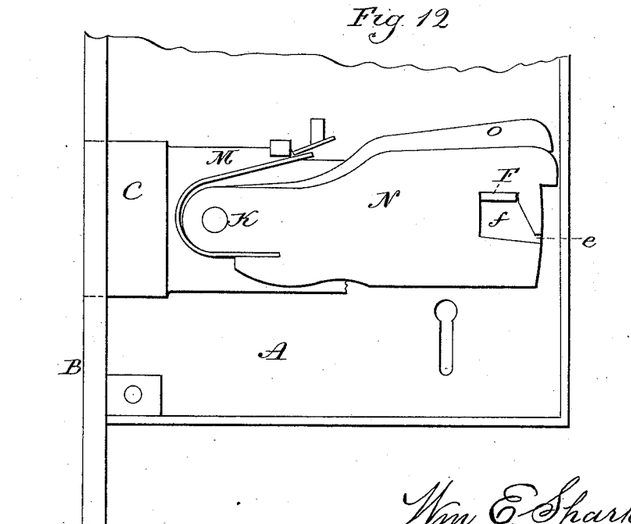
Fig. 12, the same as Fig. 11, with the bolt drawn, showing the position of the tumbler N at that time.

The tumbler N, as seen in Figs. 11 and 12, is constructed with but a single gate, $e$. This tumbler is designed not only as a tumbler to be actuated by the key, but as a device for holding the bolt in the drawn position. The gate $e$ opens into a recess, $f$, which at its upper end corresponds to the stump F, and so that in unlocking the bolt the tumbler N is raised until the gate $e$ comes into line with the stump, as seen in broken lines, Fig. 11. Then as the bolt is thrown the tumbler passes onto the stump, and when released from the key will drop to bring the stump into the upper part of the recess $f$, which engages the stump upon the rear side, as seen in Fig. 12, so as to prevent a forward movement of the bolt until that tumbler shall be raised, so as to release it from engagement with the stump.

Figure 13:
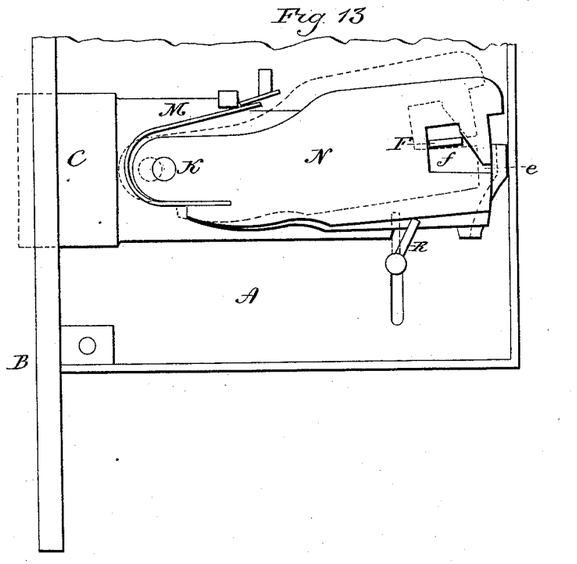
Figs. 13 and 14 illustrate the operation of the tumbler N under the locking and unlocking movement with the two keys.
Figure 14:
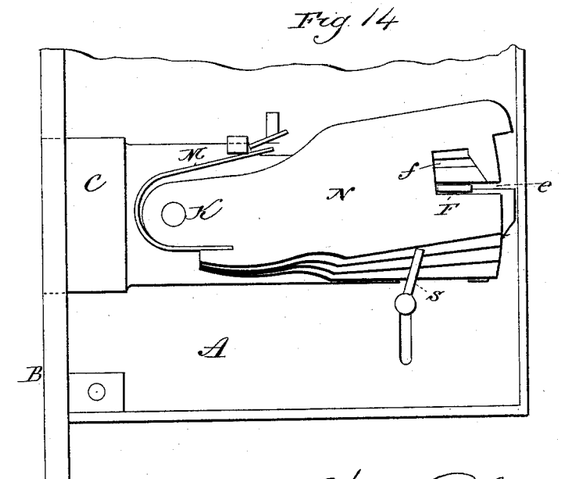

The rear edge of the recess $f$ is inclined downward and rearward, so that as the tumbler N is raised by the key in locking so far as to bring the inclined surface upon the stump, as seen in Fig. 13, then the advance movement of the bolt will cause the stump to act as a cam upon the said inclined surface, and the tumbler will thereby rise to a higher extent than that which would be produced by the key and until the gate is in line with the stump, as indicated in broken lines, Fig. 13;

but, in unlocking, the tumbler must be raised until the gate is in line with the stump, as indicated in broken lines, Fig. 11, so that this tumbler with its single gate is common to both keys. If, however, dependence be had upon the notch J in the bolt to engage with the stump, to prevent accidental outward movement, this feature of the tumbler N may be omitted; or, with the tumbler thus constructed, the notch between the stump and bolt may be omitted, it only being necessary that there shall be some engagement between the bolt and tumblers which will hold the bolt when in the drawn position.

If a device to hold the bolt in the drawn position, as I have described, is not deemed necessary, as it may not be in some cases, then such device may be omitted.

Figure 15:
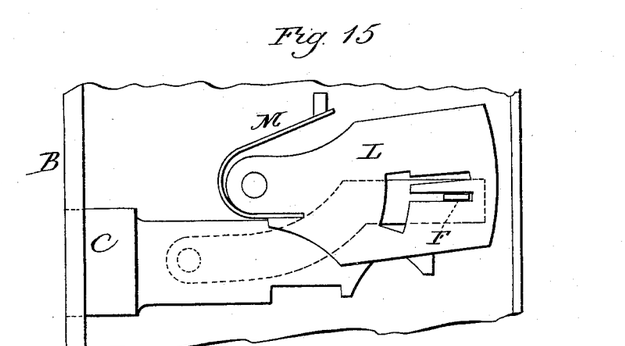
Figs. 15, 16, and 17, modifications.
Figure 16:
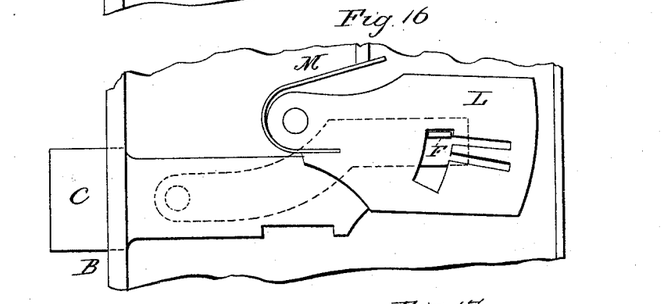

I have thus far represented the tumblers as hung to and moving with the lock-bolt, while the stump-lever is hung upon a stationary pivot in the case. This order may be reversed and the tumblers hung upon a stationary pivot in the case and the stump hung upon a pivot on the bolt. Such a modification I illustrate in Fig. 15, representing only a single tumbler. Under this arrangement the gates open forward, and to that end a slot is made in the tumbler in width corresponding to the stump and concentric with the pivot upon which the tumbler swings, and the respective gates are made to open from this slot rearward. The upper end of the slot extends above the upper gate, so as to form the locking-shoulder to engage the stump when the bolt is thrown, as represented in Fig. 16.

In unlocking, the key operates first to raise the tumblers until the gates register with the stump, then engages the talons of the bolt, and the bolt will be drawn, the stump passing into the gate, as represented in Fig. 15, and if the bolt be so drawn by one key then when the other key is applied to throw the bolt the tumblers, with the stump projecting through the gates, will all be raised by the engagement of the stump with the tumblers, and this will be irrespective of which key is employed to so throw the bolt or which key had previously drawn the bolt, as before described.

Figure 17:
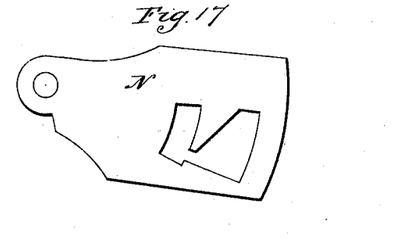

Fig. 17 represents a tumbler, N, corresponding to the tumbler N of the first description, and which is constructed with the same single gate opening into the same recess, and which recess is adapted to engage the tumbler and hold the bolt in its drawn position, as described for the tumbler N in the first illustration. It will be seen that it is immaterial to the invention whether the tumblers be hung to the bolt, so as to move with it, and the stump-lever hung upon a stationary pivot in the case or whether the stump-lever be hung to the bolt, and so as to move with it, and the tumblers hung upon a stationary pivot in the case. I, however, prefer the first construction. Under this construction a very extensive variation may be made in locks for the principal key, and yet one master-key operate all such locks, and in any case it is immaterial whether the bolt be thrown or drawn by one key or the other or whether such drawing or throwing be produced upon one side of the door or the other.

It will be understood that the number of tumblers may be increased or reduced as occasion may require, and more or less of the tumblers may be made common to both keys, it only being essential that one or more of the tumblers shall have two gates corresponding to the respective keys, and which gates are adapted to engage the stump in drawing the bolt with the principal key.

I claim—

1. In a master-key lock, the combination of the bolt, the talons of which are adapted to be engaged by either key, a lever carrying a laterally-projecting stump and hung upon a pivot so as to swing in a vertical plane, one or more tumblers also hung upon a pivot so as to swing in vertical planes, the said pivot for the said lever and the pivot for the said tumbler being the one stationary in the case and the other on the bolt and movable with it, the said tumblers constructed with gates corresponding to the said stump, the said stump extending through all the tumblers, and one or more of said tumblers constructed with two such gates, the said gates being adapted to pass onto the stump in drawing the bolt, but to escape therefrom when the bolt is thrown, and the said tumblers each constructed with a shoulder adapted to engage with said stump when the bolt is in the thrown position, substantially as described.

2. In a master-key lock, the combination of the bolt, the talons of which are adapted to be engaged by either key, a lever carrying a laterally-projecting stump and hung upon a pivot so as to swing in a vertical plane, one or more tumblers also hung upon a pivot so as to swing in vertical planes, the said pivot for the said lever and the pivot for the said tumbler being the one stationary in the case and the other on the bolt and movable with it, the said tumblers constructed with gates corresponding to the said stump, the said stump extending through all the tumblers, and one or more of said tumblers constructed with two such gates, the said gates being adapted to pass onto the stump in drawing the bolt, but to escape therefrom when the bolt is thrown, and the said tumblers each constructed with a shoulder adapted to engage with said stump when the bolt is in the thrown position, the bolt constructed with a notch corresponding to the stump to engage the bolt when in the drawn position, substantially as and for the purpose described.

3. In a master-key lock, the combination of the bolt, the talons of which are adapted to be engaged by either key, a lever carrying a laterally-projecting stump and hung upon a pivot so as to swing in a vertical plane, one or more tumblers also hung upon a pivot so as to swing in vertical planes, the said pivot for the said lever and the pivot for the said tumbler being the one stationary in the case and the other on the bolt and movable with it, the said tumblers constructed with gates corresponding to the said stump, the said stump extending through all the tumblers, and one or more of said tumblers constructed with two such gates, the said gates being adapted to pass onto the stump in drawing the bolt, but to escape therefrom when the bolt is thrown, and the said tumblers each constructed with a shoulder adapted to engage with said stump when the bolt is in the thrown position, one of said tumblers, N, having a single gate and constructed with a recess into which said gate opens, the edge of said recess inclined from the gate upward and toward the stump when in the drawn position, the top of said recess forming a notch, which is adapted to engage the said stump when the bolt is in the drawn position, substantially as described.

WILLIAM E. SPARKS.

Witnesses:
WM. S. COOKE,
WM. S. HASTINGS.